United States Patent
Lueker

(10) Patent No.: US 9,228,385 B2
(45) Date of Patent: Jan. 5, 2016

(54) APPARATUS AND METHOD FOR EXTENDING DOOR BRAKE LIFESPAN

(71) Applicant: Cornell Ironworks Enterprises, Mountaintop, PA (US)

(72) Inventor: David Lueker, Glendale, AZ (US)

(73) Assignee: CORNELL IRONWORKS ENTERPRISES, Mountaintop, PA (US)

( * ) Notice: Subject to any disclaimer, the term of this patent is extended or adjusted under 35 U.S.C. 154(b) by 0 days.

(21) Appl. No.: 14/012,860

(22) Filed: Aug. 28, 2013

(65) Prior Publication Data

US 2015/0059252 A1  Mar. 5, 2015

(51) Int. Cl.
*A47G 5/02* (2006.01)
*E05F 5/00* (2006.01)
*E05D 13/00* (2006.01)

(52) U.S. Cl.
CPC .............. *E05F 5/003* (2013.01); *E05D 13/003* (2013.01); *E05Y 2201/21* (2013.01); *E05Y 2900/11* (2013.01)

(58) Field of Classification Search
CPC .............. E05D 13/10–13/1292; E05D 13/003; E05F 5/003; F16D 59/00
USPC .......................................... 160/296, 297, 300
See application file for complete search history.

(56) References Cited

U.S. PATENT DOCUMENTS

| | | | | |
|---|---|---|---|---|
| 3,779,591 A | * | 12/1973 | Rands ........................... | 293/133 |
| 3,915,261 A | * | 10/1975 | Jett et al. ........................ | 188/67 |
| 4,222,464 A | * | 9/1980 | Moriya et al. ............. | 188/73.44 |
| 4,365,695 A | * | 12/1982 | Rath .......................... | 188/73.39 |
| 4,531,617 A | * | 7/1985 | Martin et al. ................. | 187/373 |
| 4,567,977 A | * | 2/1986 | Fisher ......................... | 193/25 B |
| 5,697,476 A | * | 12/1997 | Susmark ...................... | 188/189 |
| 6,725,981 B1 | * | 4/2004 | Franz ......................... | 188/73.45 |
| 6,862,845 B2 | * | 3/2005 | Schiks .......................... | 49/322 |
| 6,986,378 B2 | * | 1/2006 | Beaudoin et al. ............. | 160/191 |
| 7,254,868 B2 | * | 8/2007 | Mullet et al. .................... | 16/198 |
| 7,543,625 B2 | * | 6/2009 | Beaudoin et al. ............. | 160/191 |
| 2006/0185800 A1 | * | 8/2006 | Beaudoin et al. ............. | 160/191 |
| 2007/0204515 A1 | * | 9/2007 | Barriault et al. ................ | 49/322 |
| 2010/0211144 A1 | * | 8/2010 | Jang et al. ..................... | 607/116 |

* cited by examiner

*Primary Examiner* — Katherine Mitchell
*Assistant Examiner* — Scott Denion
(74) *Attorney, Agent, or Firm* — Snell & Wilmer L.L.P.

(57) ABSTRACT

The present disclosure includes a retrofitted door brake. The retrofitted door brake may, in various embodiments, comprise a hub comprising a cylindrical central axle, a plurality of projections extending radially away from an outer circumference of the central axle, and/or a cam comprising a plurality of pins that hold the projections away from a channel wall of a brake housing. The pins may be configured to break away from the cam to release the projections into contact with the channel wall, and the pins may be fitted with a cover, such that the pins are capable of withstanding abrasion and wear. The cover may comprise a cylinder having an axially running aperture, and/or a beveled edge that shaves a layer of the outer surface from one of the plurality of pins as it is fitted over the pin.

11 Claims, 5 Drawing Sheets

APPARATUS AND METHOD FOR EXTENDING DOOR BRAKE LIFESPAN

BACKGROUND

1. Field

The present disclosure generally relates to door brakes, and more particularly to door brakes for rolling doors.

2. Discussion of the Related Art

Rollup, or rolling, doors are widely used for industrial and commercial purposes. For example, rollup doors are commonly used as cargo bay doors, self-storage unit doors, garage doors, and the like. Rollup doors often comprise a number of interconnected leaves or slats, and this group of interconnected slats may comprise a "door curtain" or "curtain," The curtain may be mounted to an overhead shaft, and as the rollup door is opened, or rolled up, the curtain may wind in layers about the shaft.

Doors of this type are very heavy and produce considerable vibration as they open and dose. Thus, rollup doors often include a brake (coupled to the shaft) to stop their descent, should they begin to fall or descend too rapidly.

Many door brakes include a cam coupled to a central hub, where the central hub is coupled, in turn, to the overhead shaft around which a rollup door may wind and unwind. The hub may comprise a plurality of metal projections that, during normal operation, do not engage a brake housing. Rather, the projections, as they rotate with the hub, are retained away from the brake housing by a plurality of pins extending from an inner (to the brake) surface of the cam. In the event that the door to which the brake is coupled falls, the pins are configured to break away from the cam, releasing the projections, such that contact is made between the projections and the brake housing. As this occurs, the hub is no longer able to rotate, and the motion of the door is halted.

However, it is not uncommon that, over the life of the brake, the pins will slowly abrade away through the vibration induced by the motion of the rollup door, As the pins are slowly worn away, the projections coupled to the hub make their way ever closer to the brake housing until contact is eventually made, bit by bit, with the brake housing. As contact is slowly made between the rotating projections and the brake housing, the projections begin to lathe or mill away that portion of the brake housing they are intended to contact in the event that a door may fall. Finally, in the event that the door in fact falls, as what remains of the pins breaks away, the projections have worn the housing away and are unable to engage, allowing the door to fall. This occurrence is of particular concern where brakes are coupled to high cycle rollup doors, Accordingly, it is desirable to construct a brake capable of safely operating over a large number of cycles. In particular, it is desirable to construct a brake in which the pins extending from the cam do not slowly wear away.

SUMMARY

The present disclosure includes a retrofitted door brake. The retrofitted door brake may, in various embodiments, comprise a hub comprising a cylindrical central axle, a plurality of projections extending radially away from an outer circumference of the central axle, and/or a cam comprising a plurality of pins that hold the projections away from a channel wall of a brake housing. The pins may be configured to break away from the cam to release the projections into contact with the channel wall, and the pins may be fitted with a cover, such that the pins are capable of withstanding abrasion and wear. The cover may comprise a cylinder having an axially running aperture, and/or a beveled edge that shaves a layer of the outer surface from one of the plurality of pins as it is fitted over the pin. The cover may expand radially as the beveled edge shaves a layer of the outer surface from the one of the plurality of pins. In addition, the cover may comprise a wear resistant material, and may fit over a portion of a pin, leaving a portion of the pin exposed.

The present disclosure further includes a door brake cam. The cam may comprise a cylindrical inner surface, an outer surface comprising and a generally uneven surface that follows the curvature of the cylindrical inner surface, In various embodiments, the inner surface and the outer surface may define an aperture, as well as, about the aperture, a cam body. The cam may further comprise at least one pin extending axially away from the cam body, and the pin may be fitted with a wear resistant cover. The cover may comprise a cylinder having an axially running aperture and/or at least one beveled edge. The beveled edge may shave a layer of the outer surface from one of the plurality of pins as it is fitted over the pin, and may expand radially as it does so. The cover may comprise a steel cover. In addition, in various embodiments, the wear resistant cover may fit over a portion of a pin, leaving a portion of the pin exposed.

The present disclosure further includes a door brake. The door brake may comprise a hub comprising a cylindrical central axle, a plurality of projections extending radially away from an outer circumference of the central axle, and a cam comprising a plurality of wear resistant pins that hold the projections away from a channel wall of a brake housing, where the pins configured to break away from the cam to release the projections into contact with the channel wall. The plurality of pins may comprise a wear resistant material, such as steel.

The present disclosure further includes a method for retrofitting a door brake. The method may comprise removing a cam from a door brake housing, fitting a cover over at least one pin extending axially from the cam, and replacing the cam within the door brake housing. The cover may comprise a cylinder having an axially running aperture and/or at least one beveled edge.

BRIEF DESCRIPTION OF THE DRAWINGS

The features and advantages of the present disclosure will become more apparent from the detailed description set forth below when taken in conjunction with the drawings, wherein.

DETAILED DESCRIPTION OF THE ILLUSTRATED EMBODIMENTS

Figure 1:
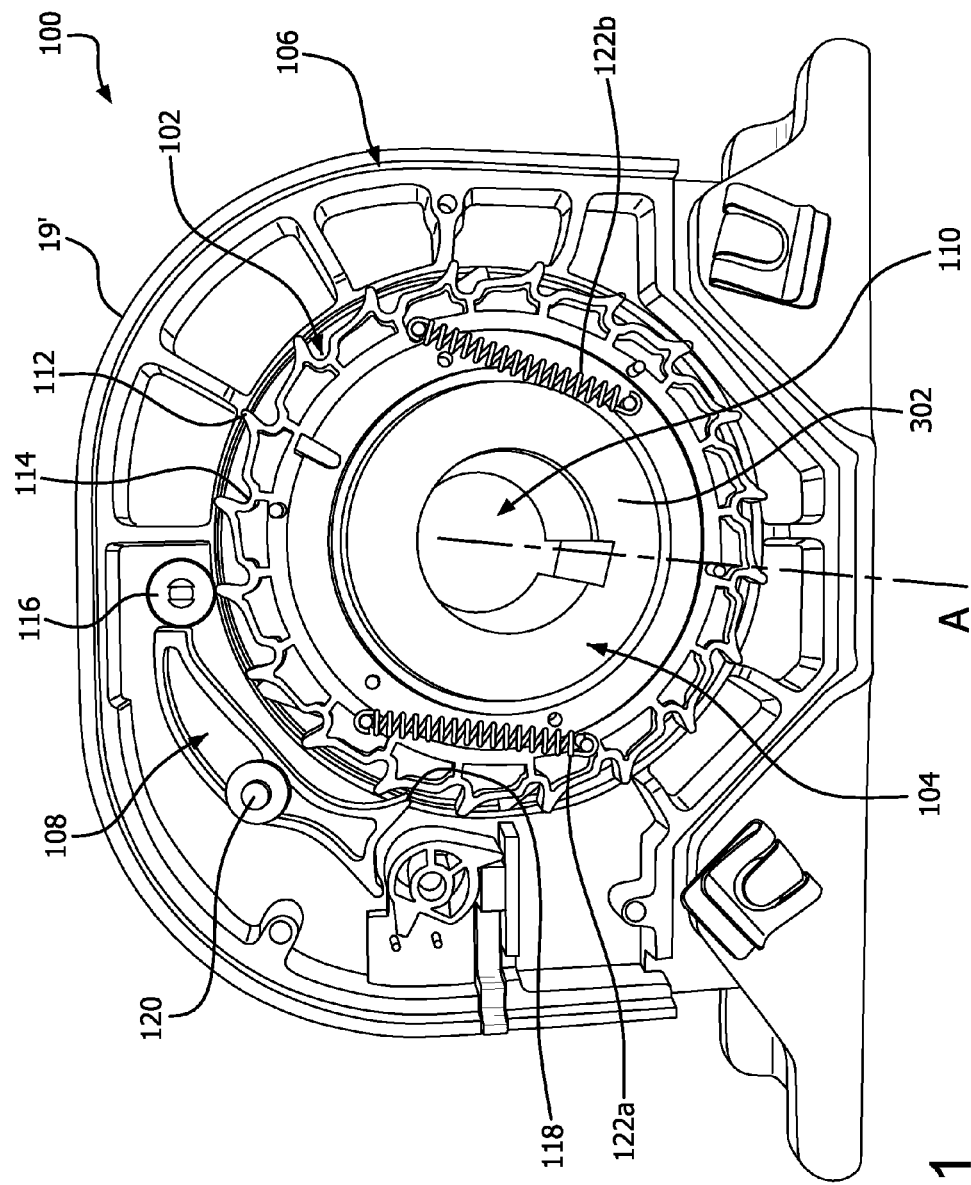
FIG. 1 illustrates a perspective view of a door brake.

Persons skilled in the art will readily appreciate that various aspects of the present disclosure may be realized by any number of methods and apparatuses configured to perform the intended functions. Stated differently, other methods and apparatuses may be incorporated herein to perform the intended functions. It should also be noted that the accompanying drawing figures referred to herein are not all drawn to scale, but may be exaggerated to illustrate various aspects of the present disclosure, and in that regard, the drawing figures should not be construed as limiting. Finally, although the present disclosure may be described in connection with various principles and beliefs, the present disclosure should not be bound by theory.

While the specific embodiments are described in greater detail below, in general, the present disclosure will focus primarily upon an apparatus and method for extending the functional lifespan of a door brake.

A door brake may comprise a cam coupled to a central rotating hub. The cam and hub may be disposed within a housing. The hub may comprise a central axle and a plurality of angled projections extending therefrom that rotate with the axle. The cam may comprise a plurality of pins extending away from the cam toward the hub, Specifically, the pins may extend into the space between the axle and the projections forming the hub. In addition, the cam may be coupled to the hub through one or more springs. The force exerted by the springs on the cam may cause the pins extending from the cam to exert a force against the projections extending from the hub. This force against the projections may retain the projections away from the housing. Thus, in other words, during normal operation, the pins may hold the projections away from the housing.

The cam may rotate with the hub as a door shaft to which the hub is coupled is opened and closed (i.e., lowered and raised). The cam may, in addition to the features described above, also comprise a series of peaks and valleys. And, in various embodiments, an arm coupled to the housing and terminating in a wheel may follow or roll over the uneven surface of the cam as the cam rotates. Specifically, the brake may be situated such that the force of gravity causes the wheel to drop into each consecutive trough as the cam rotates.

The cam may interface with the hub such that, in the event that a door to which the brake is coupled descends too rapidly or begins to fall, the wheel coupled to the arm may not have sufficient time to drop into the next consecutive trough. Thus, where a door descends too rapidly, the arm may ride from peak to peak in a raised position. This condition may cause a spur disposed at an end of the arm opposite the wheel to catch in a cam trough. As the spur catches in a cam trough, the wheel may come to a full stop. However, the hub may continue to rotate, even as the cam has come to a complete stop. As the hub rotates, however, the projections extending away from the hub axle may sever or break each pin away from the cam. As this occurs, the projections, formerly secured away from the housing by the cam pins, may release into contact with the housing. And, as the projections make contact with the housing, each projection may bite or dig into the housing, causing the hub to stop rotating, and the door, in turn, to stop descending.

In various embodiments, however, the motion of a rollup door (particularly where the door comprises a plurality of metal slats) may induce vibration in the brake, Over time, the vibration induced in the brake may cause the pins extending from the cam to wear or abrade away as they chatter against the projections outspread from the hub. As the pins wear slowly away, the projections may, likewise, slowly creep toward the brake housing until they finally begin by a slow process of abrasion themselves to wear a channel or groove in the brake housing. Finally, if the pins have worn too much away, a brake may not be able to stop a falling door, though the projections may come into some slight contact with the brake housing. Rather, the channel worn in the housing may prevent the projections from making contact with the housing adequate to halt the progress of the door.

To extend the functional lifespan of a door brake, then, and as described in greater detail below, one or more pins may be covered with a durable or reinforcing sleeve, The sleeve may comprise a beveled or sharpened edge or edges. In addition, a sleeve may comprise a cylinder having an axially running opening or aperture.

In operation, a sleeve may be fitted over a pin such that a beveled edge of the sleeve shaves off a layer of the outer surface of the phi. This layer of material may bunch under the sleeve, causing the sleeve to expand or distend slightly, The axially running aperture may accommodate this slight expansion, and the sleeve may thus be tightly pressure fitted over a pin.

With reference now to FIG. 1, a door brake 100 is shown. The brake 100 may comprise a cam 102, a hub 104, a housing 106, an arm 108, and springs 122a and/or 122b, The hub 104 may define a generally cylindrical aperture 110, which may pass entirely through the door brake 100, and which may couple, during operation, to a rollup door shaft. As shown, the line passing through the hub 104 may define an axis, denoted A-A', The cam 102 may, as shown with respect to FIG. 1 (but see FIG. 4 and surrounding discussion), comprise an undulating series of crests (e.g., crest 112) and troughs (e.g., trough 114). The arm 108 may, in turn, comprise a wheel 116, a spur 118, and a pivot 120, The wheel 116 may be capable of spinning. The arm 108 may be capable of pivoting about the pivot 120, such that the arm 108 may move relative to the cam 102.

Figure 2:
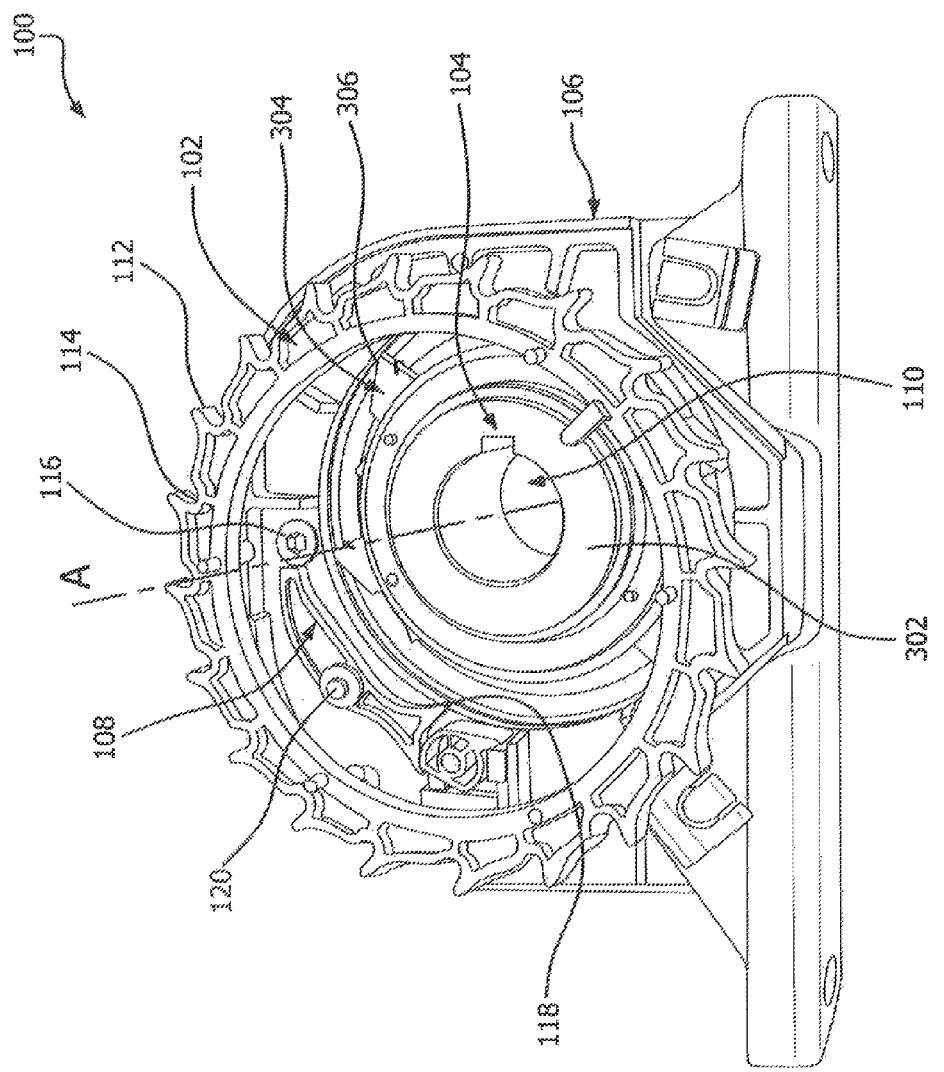
FIG. 2 illustrates exploded view of a door brake, showing the placement of the cam relative to the hub.
Figure 3:
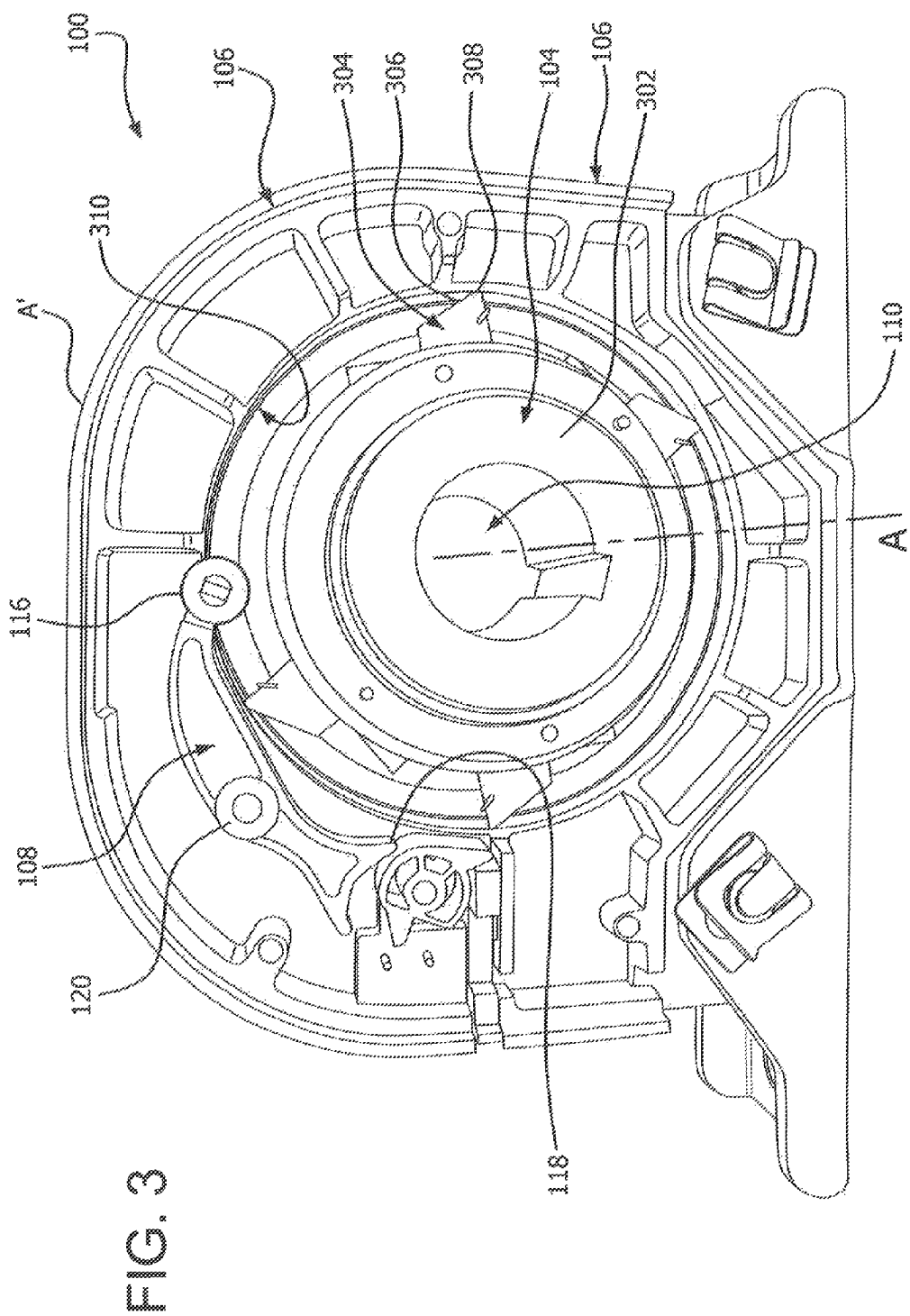
FIG. 3 illustrates a perspective view of a door brake with the cam removed.

Referring to FIG. 2, the cam 102 may be removed from the door brake 100 to reveal the hub 104 in greater detail, For example, with reference to FIG. 3 (where the cam 102 has been removed), the hub 104 may comprise an axle 302 and one or more projections (e.g., projection 304). The projections 304 may extend radially outward from an outer surface or circumference of the central axle 302. The projections 304 may be capable of changing position. For example, the projections 304 may, in various embodiments, be movable between a position that is not in contact with a channel wall 310 formed in the housing 106 and a position that is in contact with the channel wall 310 formed in the housing. The distance between the projections 304 and the channel wall 310 may be approximately several millimeters, where contact is not made between the projections 304 and the channel wall 310.

The projections 304 may further have angled edges 300, as shown, in various embodiments, during operation, the hub 104 may rotate in a clockwise direction. Thus, the point 308 of each edge 306 may, if contact is made between the edge point 308 and the channel wall 310, oppose continuing rotation of the hub 104. Specifically, if contact is made between an edge point 308 and the channel wall 310, the edge point 308 may burrow into or wedge against the channel wall 310. Thus, in the event that the projections 304 make contact with the channel wall 310 of the housing 106, the projections 304 may halt or substantially halt the rotation of the hub 104.

Figure 4:
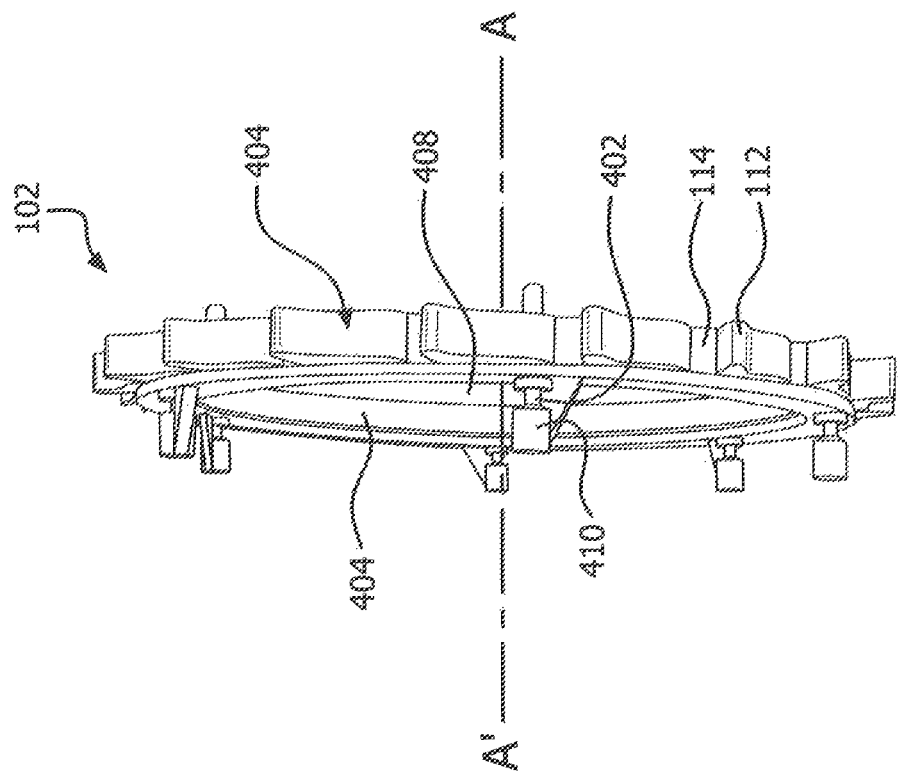
FIG. 4 illustrates a side perspective view of a cam.

With reference to FIG. 4, as best shown from this perspective (but see cam discussion surrounding FIG. 1 above), the cam 102 may generally comprise a cylindrical inner surface 404 and an outer surface 406. The outer surface 406 may comprise a generally uneven surface that follows the curvature of the cylindrical inner surface 404. Further, the inner surface 404 and the outer surface 406 may define an aperture 408, as well as, about the aperture 408, the cam 102 (or "cam body" 102). The cam 102 may, in addition, include at least one pin 402 extending axially away from the cam therefrom, and the pin 402 may be fitted with a wear resistant cover 410.

With additional regard to FIG. 4, a cam 102 may comprise a series of pins (e.g., pin 402). These pins 402 may extend towards the projections 304 described above. Specifically, these pins 402 may extend along the axis A-A' in the direction of A'. The pins 402 may comprise a plastic or other similar material, and may, through a force exerted against the cam 102 and/or the hub 104, urge the projections 304 into a position that is away from or not in contact with the channel wall 310, Note, however, that to urge the projections 304 away from the channel wall 310, the pins 402 must remain in contact with the projections 304. Thus, as the hub 104 and cam 102 rotate with the operation of a rolling door, the pins 402 may, through contact with the projections 304, prevent the projections 304 from halting the operation of the rolling door.

With returning reference now to FIG. 1, as a door shaft coupled to the hub 104 through aperture 110 rotates (Le., as a door coupled to the shaft is raised and lowered), the hub 104 may rotate in unison. As the hub 104 rotates, the cam 102 may also rotate. And, as the cam 102 rotates, the wheel 116 coupled to the arm 108 may roll over the uneven surface or circumference of the cam 101 in particular, the brake may be situated or installed such that the rotation of the cam 102 causes the wheel to rise over a crest 112, while the force of gravity causes the wheel 116 to drop into each consecutive trough 114.

In the event, however, that a door to which the brake 100 is coupled descends too rapidly or begins to fall, the wheel 116 coupled to the arm 108 may not have sufficient time to drop into the next consecutive trough. Thus, where a door descends too rapidly, the arm 108 may ride or bounce from crest to crest in a raised position. This condition may cause the spur 118 to catch in a cam trough (e.g., trough 114). As the spur 118 catches in a cam trough, the wheel 116 may come to a full stop. However, the hub 104 may continue to rotate, even as the cam 102 has come to a stop. As the hub 104 rotates, the projections (e.g., projection 304) extending away from the hub axle 302 may rotate with the hub axle 302 to break one or more pins 402 away from the cam 102. As this occurs, the projections 304 (formerly secured away from the channel wall 310 by the pins 402) may be released into a position that makes contact with the channel wail 310. Further, as the projections 304 make contact with the channel wall 310, each the point 308 of each projection 304 may bite or dig into the channel wall 310 of the housing 106, causing the hub 104 to stop rotating, and the door, in turn, to stop descending.

In various embodiments, however, the motion of a rollup door (particularly where the door comprises a plurality of metal slats) may induce vibration in the brake 100, Over time, the vibration induced in the brake 100 may cause the pins 402 extending from the cam 102 to wear or abrade away as they chatter and vibrate against the projections 304 outspread from the hub 104. As the pins 402 wear slowly away, the projections 304 may, likewise, slowly creep toward the channel wall 310 of the brake housing 106 until they finally begin to wear a deeper channel or groove in the channel wall 310 of the brake housing 106. Further, if the pins 402 have worn too much away, a brake 100 may not be able to stop a falling door. Specifically, if the channel wall 310 is worn too deeply, the projections 304 may come only into slight contact with channel wall insufficient to halt a falling door, or the projections 304 may not make contact with the channel wall 310 at all.

Figure 5:
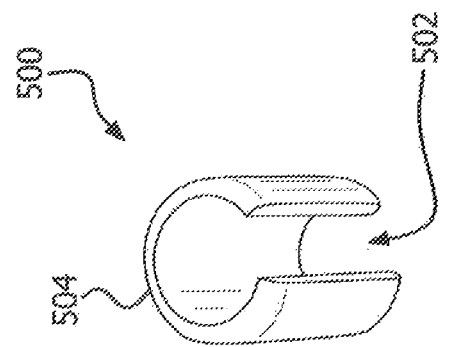
FIG. 5 illustrates a pin cover.

To extend the functional lifespan of a door brake 100, as described more briefly above, one or more pins 402 may be covered with a durable and/or reinforcing sleeve or cover 500. For example, with attention to FIG. 5, a cover 500 may comprise a cylinder having an axially running opening, slot, or aperture 502. The cover 500 may comprise any of a variety of suitable materials, including, for example, steel, hardened steel, various alloys, sintered metals, high performance composites and/or plastics, and the like. In addition, in various embodiments, the cam 102 and/or one or more pins (e.g., pin 402) may comprise any of the materials described herein, including for example, a sintered metal.

In various embodiments, a cover 500 may be coupled to each phi (e.g., pin 402). More particularly, a cover 500 may be fitted over (e.g., pressure fitted over) a pin. To this end, a cover 500 may comprise a beveled edge 504, In addition, a cover may comprise greater than a single beveled edge, so that a cover may be fitted over a pin from either of its ends. Further, in various embodiments, a cover 500 may cover an entire length of a pin 402, and/or the cover may leave a portion of the pin 402 (e.g., the portion of the pin 402 closest to the cam 102) uncovered, so that the pin 402 may more easily break away from the cam 102 (see, e.g., FIG. 4).

Figure 6:
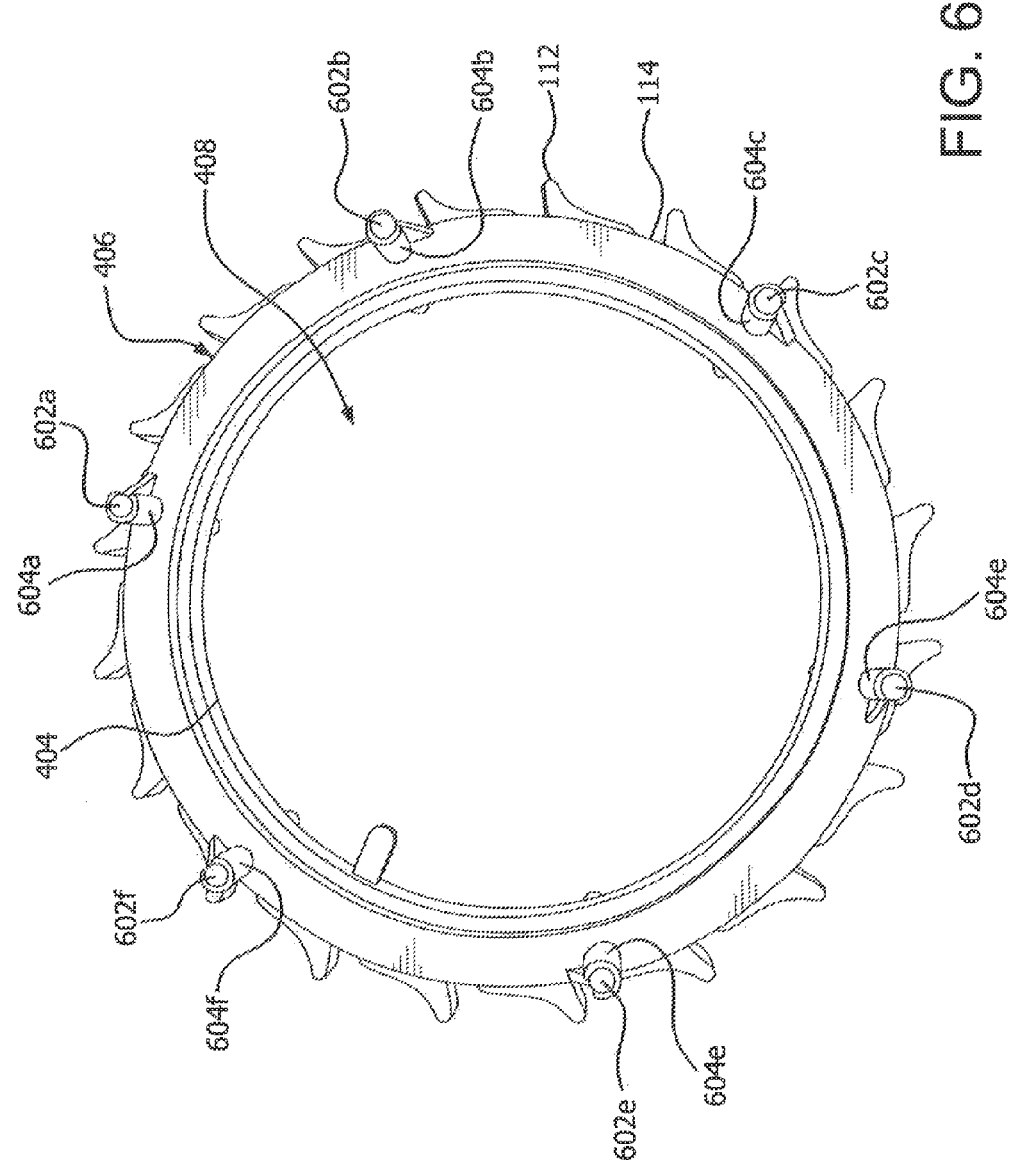
FIG. 6 illustrates a top perspective view of a cam.

In operation, as the cover 500 is fitted over a pin, the beveled edge 504 may shave or shear off a portion or layer of the outer (usually plastic) surface of the pin. This layer of material may bunch under the cover 500, causing the cover 500 to undergo a radial expansion or distension, thereby tightening the cover 500 further about the phi. The axially running aperture 502 may accommodate or permit this expansion of the cover 500. The cover 500 may thus be tightly pressure fitted over a pin. Therefore, as shown briefly with respect to FIG. 6, the pins 602a-f may be coupled to covers 604a-f, Further, in various embodiments, a pin 402 not be fitted with a reinforcing cover 500. Rather, the pin 402 may comprise a hardened material from the first. That is, a pin 402 may be manufactured to include a wear resistant material, such as a metal, and/or a pin 402 may be manufactured that that it wholly comprises a wear resistant material.

The present disclosure therefore permits a relatively low cycle door brake to be coupled to an extremely high cycle rolling door system. The present disclosure further permits the installation of a (retrofitted) relatively low cycle door brake to a plurality of low cycle doors. Specifically, as low cycle doors wear out and require replacement, the retrofitted (or newly constructed) brake disclosed herein may be coupled to each successive low cycle door system. In addition, the present disclosure contemplates the construction of high cycle door brakes having wear resistant pins capable of withstanding the damage and abrasion inherent to long life operation. In tests, one particular low cycle brake was in need of replacement due to pin wear after approximately 200,000 cycles, This brake was retrofitted as described herein with a plurality of pin covers, and the brake's functional lifespan was increased to over 650,000 cycles. Thus, the features and advantages of the present disclosure have proven quite useful in the field.

Numerous characteristics and advantages have been set forth in the preceding description, including various alternatives together with details of the structure and function of the devices and/or methods. The disclosure is intended as illustrative only and as such is not intended to be exhaustive. It will be evident to those skilled in the art that various modifications may be made, especially in matters of structure, materials, elements, components, shape, size, and arrangement of parts including combinations within the principles of the invention, to the full extent indicated by the broad, general meaning of the terms in which the appended claims are expressed. To the extent that these various modifications do not depart from the spirit and scope of the appended claims, they are intended to be encompassed therein.

What is claimed is:

1. A retrofitted door brake comprising:
   a brake housing;

a hub disposed within the housing and comprising a cylindrical central axle;
a plurality of projections extending radially away from an outer circumference of the central axle; and
a cam operatively coupled to the hub, the cam comprising a plurality of pins extending laterally out of the cam towards the brake housing;
a plurality of covers each operatively coupled to respective one of the plurality of pins; and
wherein the plurality of pins hold the plurality of projections away from a channel wall of the brake housing,
wherein the plurality of pins and covers are configured to break away from the cam to release the projections into contact with the channel wall, such that the plurality of pins and covers are capable of withstanding abrasion and wear.

2. The retrofitted door brake of claim 1, wherein the cover comprises a cylinder having an axially running aperture.

3. The retrofitted door brake of claim 1, wherein the cover comprises a beveled edge that shaves a layer of an outer surface from one of the plurality of pins as it is fitted over the pin.

4. The retrofitted door brake of claim 3, wherein the cover expands radially as the beveled edge shaves the layer of the outer surface from the one of the plurality of pins.

5. The retrofitted door brake of claim 1, wherein the cover comprises a wear resistant material.

6. The retrofitted door brake of claim 1, wherein the each one of the plurality of covers fits over a first portion of one of the respectively plurality of pins, leaving a second portion of each of the plurality of pins exposed.

7. A door brake comprising:
a brake housing;
a hub comprising a cylindrical central axle;
a plurality of projections extending radially away from an outer circumference of the central axle;
a cam comprising a plurality of pins extending laterally out of the cam, the plurality of pins configured to hold the projections away from a channel wall of the brake housing; and
a plurality of covers each operatively coupled to a respective one of the plurality of pins; and
wherein the plurality of pins and covers are configured to break away from the cam to release the projections into contact with the channel wall to stop a descending door in response to a brake system failure.

8. The door brake of claim 7, wherein the plurality of pins comprise a wear resistant material.

9. The door brake of claim 7, wherein the plurality of pins comprise steel.

10. The retrofitted door brake of claim 1, wherein the plurality of pins and covers is configured for at least twice as many cycles as a door brake comprising conventional pins.

11. The door brake of claim 7, wherein the plurality of pins and covers is configured to operate for at least twice 400,000 cycles.

* * * * *